(12) United States Patent
Reif et al.

(10) Patent No.: US 6,835,436 B1
(45) Date of Patent: Dec. 28, 2004

(54) PLASTIC STRUCTURAL ELEMENT WITH INSERTS

(75) Inventors: Georg Reif, Sins (CH); Dieter Faisst, Winterthur (CH); Michael Niedermeier, Neuhausen am Rheinfall (CH)

(73) Assignee: Alcan Technology & Management Ltd. (CH)

( * ) Notice: Subject to any disclaimer, the term of this patent is extended or adjusted under 35 U.S.C. 154(b) by 0 days.

(21) Appl. No.: 09/540,028

(22) Filed: Mar. 31, 2000

(30) Foreign Application Priority Data

Mar. 31, 1999 (CH) .............................................. 0610/99

(51) Int. Cl.[7] .............................................. B32B 7/00
(52) U.S. Cl. ......................... 428/119; 428/57; 428/58; 428/60; 428/111; 428/116; 428/118
(58) Field of Search .............................. 428/57, 58, 60, 428/111, 138, 116, 119

(56) References Cited

U.S. PATENT DOCUMENTS

| | | | |
|---|---|---|---|
| 4,031,601 A | 6/1977 | Staub et al. | 29/156.8 |
| 4,226,550 A | 10/1980 | Kupcak et al. | 403/157 |
| 4,483,904 A | 11/1984 | Church | 428/543 |
| 4,546,880 A * | 10/1985 | Reese | 206/410 |
| 5,118,257 A | 6/1992 | Blakeley et al. | 416/219 |
| 5,319,026 A * | 6/1994 | Hahn et al. | 525/192 |
| 5,667,866 A * | 9/1997 | Reese, Jr. | 428/133 |
| 5,691,391 A | 11/1997 | Chen et al. | 521/99 |
| 6,238,783 B1 * | 5/2001 | Komai et al. | 428/312.8 |

FOREIGN PATENT DOCUMENTS

| | | |
|---|---|---|
| DE | 37 21 577 | 1/1988 |
| DE | 41 17 167 | 11/1992 |
| EP | 370 342 | 5/1990 |
| EP | 508 629 A2 | 10/1992 |
| EP | 0528131 * | 2/1993 |
| EP | 872 650 | 10/1998 |

\* cited by examiner

*Primary Examiner*—Harold Pyon
*Assistant Examiner*—Marc Patterson
(74) *Attorney, Agent, or Firm*—Ostrolenk, Faber, Gerb & Soffen, LLP

(57) ABSTRACT

Inserts of metal in the plastic of a plastic structural element are coated with a coupling layer of fibre-reinforced plastic, which reduces the abrupt change in stiffness and/or coefficient of thermal expansion at the joining interfaces in the metal-plastic composite. By altering the volume fraction of fibres and/or by different orientation of the fibre layers within the coupling layers, a gradual change in the E-modulus and the thermal expansion coefficient are produced, as a result of which abrupt changes in these values at the composite interfaces can be avoided. The sudden change in stiffness between the plastic material and the metal inset also reduced by reducing the stiffness of the insert, which again is achieved by specific choice of shape. Preferred, in particular, is a finger-shaped fanning out of the insert in the plastic material.

43 Claims, 4 Drawing Sheets

PLASTIC STRUCTURAL ELEMENT WITH INSERTS

BACKGROUND OF THE INVENTION

1. Field of the Invention

The present invention relates to a plastic structural element comprising a plastic material and one or more inserts having length embedded in the plastic material, such that the inserts exhibit the same or different values of rigidity and/or thermal expansion coefficients compared to those of the plastic. Also within the scope of the invention is a process for manufacturing the plastic structural element and the use of the plastic structural element according to the invention.

2. Discussion of the Prior Art

Fibre-reinforced plastics are employed ever increasingly in vehicle and aircraft manufacture and in the building industry, this because of favourable material properties such as low weight, corrosion resistance, high strength and the almost unlimited possibilities regarding shape. Reinforced plastics are employed therefore e.g. in automobile manufacture for body parts such as boot lids, bonnets or aerodynamic trim (spoilers), whereby in particular glass fibre reinforced plastics (GRP), carbon fibre reinforced plastics (CRP) and aramide fibre-reinforced plastics find wide application. Since fire-resistant plastics started to be used, fibre-reinforced plastics have also been employed in areas which, because of fire risks, were previously not possible.

Assembling or fitting such plastic structural elements onto metal components or other plastic components i.e. the methods of joining, presents great problems to designers. In particular continuous fibre reinforced plastic elements cannot be joined directly to other components simply by mechanical means such as riveting or screw type connections as the difference in strength, rigidity and elasticity of the individual materials leads to local points of weakness at the joint interfaces.

Adhesive joints are often used to connect metal and reinforced plastic elements to each other. These joints, however, require very clean surfaces for adhesion and therefore often call for special surface pre-treatments. They require complicated, time-consuming work under the cleanest possible conditions. Adhesive joints often exhibit only limited strength or require very large bonding areas, which again results in restrictions in design possibilities.

Further, it is also known to integrate inserts made of metal, e.g. threaded bushes, into the plastic elements. These serve as places for joining screw type connections to other components e.g. metal structures. These inserts are, however, relatively small parts that are built into the plastic in specific regions. Often, these inserts exhibit a complex structure in order for the metal-plastic joint to achieve adequate strength. The use of such inserts is expensive and is limited to plastic castings, in particular injection moulded parts that do not contain fibre-reinforced plastics or at most only short fibres. This application is not particularly suitable for vehicle body manufacture.

Patent DE 37 21 577 C2 describes a process for manufacturing plastic sockets with a metal insert that exhibits a cylindrical cross-section and on the outside a tooth-like grooving, whereby first the plastic socket is produced, followed by introduction of the metal insert into an opening in the plastic socket, and the grooving or corrugation on the metal insert pushed into the inner wall of the opening under the application of pressure and, in addition to the application of pressure, the plastic is heated. This process is, however, not suitable for fibre-reinforced plastics, in particular for those with a high fibre content. According to DE 37 21 577 C2 processes in which the metal insert is laminated in during the production of the plastic part are unsatisfactory as the large difference between the two materials leads to discontinuities and leakage in the composite part.

EP 0 872 650 A1 also describes a metal insert which is introduced into an opening in the plastic part while the latter is heated. Also this process is not suitable for fibre-reinforced plastics and does not provide the desired strength for high load applications.

DE 41 17 167 C2 describes a metal insert which is in the form of a metal support and is completely laminated into the plastic part. So called round material sections on the metal support are provided with threaded holes and form so called threaded inserts for screw type connections. The production of such composite parts is likewise very complicated as the plastic is made up of a base laminate and an outer laminate. Furthermore, the round material sections essentially permit only the use of screw type connections.

In all of the above mentioned examples the problem of an abrupt change in stiffness and the different coefficients of thermal expansion in the two materials viz., metal and plastic are not satisfactorily solved.

Inserts of metal in plastic materials are known to suffer from the problem that both materials viz., plastic and metal exhibit very different elasticity and stiffness, as a result of which zones of weakness are formed at the interfaces. In plastics reinforced with carbon fibres (CRP) the value of the elastic modulus, hereinafter called the E-modulus, may e.g. be around four times greater than that of metallic materials e.g. aluminium. As the stiffness of the product is calculated from the E-modulus and the polar moment of inertia, a significant change in stiffness occurs at the interfaces between the two materials.

Further, because of the change in stiffness at the interface to the plastic, the large polar moment of inertia of flat, large area or strip-shaped inserts e.g. of metal, have made it impossible to embed larger and large area inserts e.g. a metal strip or metal sheet as load-bearing connecting elements in a plastic structural component.

Furthermore, as a rule metallic and plastic materials exhibit different behaviour with respect to thermal expansion i.e. they have different coefficients of thermal expansion (cubic and linear coefficients of thermal expansion). With changes in temperature this leads to stresses which may be so large that separation occurs at the interfaces between the two materials.

For the above mentioned reasons, points of weakness are formed at the joining interfaces between the plastic and the insert, considerably reducing the limits to which a structure or plastic structural element may be loaded.

In general, therefore, workshops are not equipped to produce high-quality, high-strength connections between fibre-reinforced plastics and metal inserts, for which reason it is very important to, produce plastic structural elements which already exhibit the necessary connecting points in the form of inserts for attaching metal structures or other structures using e.g. mechanical attachment means.

SUMMARY OF THE INVENTION

The object of the present invention is, therefore, to provide cost-favourable structural elements or components of plastic, in particular reinforced plastic, with connecting points in the form of inserts, in particular large area inserts and preferably of metal, by means of which in spite of the different stiffness or elasticity and thermal expansion of both materials, the connection between the plastic material of the plastic structural element and the insert exhibits high mechanical strength, load bearing capacity and durability.

That objective is achieved by way of the invention in which the plastic structural element exhibits at least one of the following features:

a) the insert is joined to the plastic material via a coupling layer of plastic, and the coupling layer produces a gradual or uniform equilibration of the E-modulus determining the stiffness and/or the coefficient of thermal expansion between the plastic material and the insert and/or b) the embedded length of insert features one or more openings through which reinforcing fibres, fibre strands and/or textile type materials are looped and are embedded in and intimately joined to the plastic matrix of the plastic structural element and/or c) the embedded length of insert features strips or fingers or finger-shaped projections that lie parallel or are comb-like or fan-shape in their arrangement, whereby the composite exhibits improved strength and durability between the plastic material and the insert and withstands higher loads.

By embedded length of insert is to the be understood the part of the insert incorporated or to be incorporated in the plastic of the plastic structural element, or the length of insert joined, or to be joined, by at least one face to the plastic material.

The plastic structural element, also called plastic structure, is made of plastic, preferably reinforced plastic, in particular fibre-reinforced plastic (FRP). Reinforcing fibres that may be employed are in particular inorganic fibres such as glass fibres, carbon or graphite fibres, metal fibres, ceramic fibres, or fibres of cellulose derivatives or thermoplastics such as e.g. polyvinylchloride, polyacrylnitrile, polyacrylics, polyolefins, e.g. polypropylene, polyesters, polyamides or plastic fibres known as Kevlar® or aramide etc., or natural fibres such as fibre-like silicate minerals, jute, sisal, hemp, cotton, ramie fibres. The plastics may also be plastics reinforced with webs, weaves, mats, rovings or fleeces of the above mentioned materials. Also layers, rods, plates or films of suitable materials, e.g. the above mentioned materials, may be laid in the plastic as reinforcing material. The plastic structural elements are preferably CRP, GRP or aramide fibre-reinforced plastics.

The amount of fibres in the plastic structural element lies usefully in the range of 20–80 vol. % (volume percent), in particular 30–70 vol. %, preferably in the range of 55–65 vol. %. If the fibre content is around 60 vol. %, then a fibre-reinforced plastic of particularly high stiffness and load bearing capacity is obtained.

Further, besides reinforcing fibres, the plastic may also contain e.g. filler materials which e.g. may be coarse or fine-grained or plate-shaped. Filler materials such as e.g. calcium carbonate, kaolin, glass, mica, talcum, silicate, wollastonite or aluminium oxides reduce the coefficients of thermal expansion of the plastic. Filler materials such as aluminium oxides and antimony oxide may be employed in order to increase the fire resistance of the plastic—which is particularly important in vehicle manufacture; filler materials such as mica and silicates may be employed to increase the chemical resistance of the plastic. Electrically conducting filler material such as metal powders and graphite or soot is employed in order to avoid electro-static charging of the plastic. Fillers such as e.g. chalk, carbon particles or titanium dioxide may be employed as pigments. Colour pigments may be added for colouring purposes.

The matrix-forming plastic of the plastic in the plastic structural element may be a thermo-plastic (thermoplast) or a duroplastic (duroplast). Thermoplastics employed are in particular polyolefins, polyvinylchloride, polystyrenes, styrene-copolymers, polystyrene foam, impact resistant polystyrene, styrene-acrylnitrile-copolymers, acrylnitrile-butadien-styrene-terpolymers, acrylic ester-styrene-acrylnitrile-terpolymers, polymethylene-methacrylates, acrylic glass, polyvinyl-carbazoles, polyamides or polycarbonates. Preferred are in particular poly-esters such as polyethylene-terephthalates (PET) or polyamides.

Duroplastics used are in particular epoxy resins, plastics containing or comprising epoxy resins, phenolic-formaldehyde resins, urea-formaldehyde resins, melamine-formaldehyde resins, melamine-phenolic-formaldehyde resins, unsaturated polyester resins, polyimide or polyurethane. Preferred are epoxy resins or vinyl esters.

The inserts are e.g. of metal and may be of ferrous or non-ferrous metals, such as iron zinc coated iron steel, brass, aluminum and its alloys or magnesium and its alloys. Inserts of aluminum its alloys, steel or zinc coated iron a re employed by way of preference.

The inserts may also be laminate type composites of at least two layers in which at least one layer is one of the above mentioned metals. From the series of laminate type composite use is made preferably of sandwich elements with outer layers of a metal, preferably aluminum or its alloys, steel or zinc coated iron and a core of plastic e.g. a core of an elastomer or preferably a thermoplast or duroplast. Such composite materials are sold under the trade name Carbond® and Hylite®.

The size or lengthwise dimension of such inserts may e.g. lie in the range of 1 to 20 cm, where in particular strip-shaped inserts may also extend along the sides of plastic structural elements from 20 cm up to lengths in the region of a meter. In principle, in particular with respect to the lengthwise dimension of the insert, there is neither an upper nor lower limit.

The wall thickness, in particular of the metal inserts or aluminum inserts, is usefully 1–10 mm, preferably 2–7 mm, advantageously 3–5 mm. Wall thicknesses greater than approximately 7 mm are intended for especially large loads. The inserts are embedded in the plastic part usefully to a depth of around 5–60 mm, preferably 5 to 20 mm, advantageously to a depth of 10–15 mm.

The coupling layer is of a reinforced plastic, usefully a fibre-reinforced plastic containing one or more of the above mentioned kinds of fibre, whereby for reasons of costs, in particular glass-fibre reinforced plastics, preferably E-glass fibres ("low alkali" or "electrical grade") are employed. Preferred, however, are also carbon fibres or aramide fibres, in particular HT ("high tenacity") carbon fibres or a combination of the fibres mentioned. The fibre content of the coupling layer lies usefully in the range of 20–70 vol. %, in particular 35 –60 vol. % and preferably in the range of 45–55 vol. %.

The coupling layer may contain a plastic matrix of a thermoplastic or a duroplastic of one of the above mentioned kinds of plastic. The matrix materials of the coupling layer and of the plastic of the plastic structural element need not be the same. The coupling layer may e.g. be of a reinforced duroplast while the plastic of the plastic structural element is of a reinforced thermoplast or vice versa. The coupling layer and the plastic material preferably contain the same plastic matrix.

At the areas in question, the surfaces of the inserts of metal—also called metal joiners—or the metal surfaces of the laminates, in particular surfaces of aluminium or its alloys, are usefully subjected to a treatment in order to improve the bonding capacity of the coupling layer.

The surface is e.g. provided with a chemically produced coating using a chromate-phosphate process, chromate process (e.g. yellow, green or transparent chromate treatment), chromate-protein process or phosphate process. Further, the surface may also be anodically or chemically oxidised in order to improve the bonding capacity of the subsequent layers. If the metal joiner is of steel, degreasing and/or roughening of the metal surface e.g. by abrasion or blasting with solid material may in some circumstances be adequate as surface treatment. Also the surfaces of non-aluminum based metals may be provided with a chemically produced coating which is produced e.g. using one of the above mentioned processes. Further, the metal surfaces may also be provided with a primer or a bonding agent such as silanes or diluted adhesives.

Taking into account the means of attachment employed, the surface regions of the inserts that function as joining points and project out of the plastic structural element preferably already have the optimal shape. The surfaces have been advantageously appropriately treated with respect to the electrochemical (corrosion) or chemical effects to be expected.

The coupling layer serves as a gradient layer between the insert and the plastic of the plastic structural element. In the following, for reasons of simplicity, only plastic will be referred to, whereby by this is to be understood the principle part of a plastic structural element according to the invention.

By gradient layer in the text the following is to be understood: If two different materials are joined together, then as a rule one or more physical properties such as density, elasticity or thermal expansion change at the interface in an abrupt manner—which leads to the known disadvantages such as crack formation decohesion at the join etc. This can be avoided by introducing a gradient layer in the form of an intermediate layer, a so called coupling layer which is such that the physical properties in question between the materials to be joined, such as plastic and metal, change uniformly, gradually or in a stepwise manner and result in a balancing or equilibration of the physical properties of the neighbouring materials. This way large, abrupt changes in these properties at the interfaces are accommodated or reduced.

In the present invention the coupling layer fulfils, among others, two tasks:
1. It serves as a gradient layer with respect to the difference in elastic behaviour between the plastic material and the insert.
2. It serves as a gradient layer with respect to the difference in thermal expansion between the plastic material and the insert.

The coupling layer may be employed to fulfil only one or the other of the above tasks. Preferably, however, it serves as gradient layer both with respect to the elastic behaviour and the thermal expansion, whereby the coupling layer principally serves to balance out the thermal expansion coefficients as the latter characteristic in some circumstances exerts the more significant influence on the strength and quality of the material combination or plastic-metal composite than the different elastic modulus values.

Further, in some cases the coupling layer also serves to prevent contact corrosion between the metal inserts—in particular those of aluminum, but also those of steel or ferrous metals—and the carbon fibres of the plastic component. Here the coupling layer preferably contains glass fibres as reinforcement means, in particular at the places making contact with the metal joiners.

The insert may be coated with the plastic coupling layer in a separate processing step.

The gradient effect in the coupling layer with respect to the thermal coefficient of expansion and the modulus of elasticity is achieved amongst other parameters by the choice of the volume fraction of fibres, the type of fibre and in particular by specific alignment of the fibres or fibre layers in the composite.

Increasing the volume fraction of fibres leads as a rule to an increase in the stiffness and to a reduction in the elasticity of the plastic. Furthermore, as a rule, the increase in the fibre content produces a reduction in the thermal coefficient of expansion.

By using CRP elements i.e. plastic structural elements with a carbon fibre content of usefully 40–70 vol. % and metal joiners of aluminium or magnesium, or an alloy containing at least one of these metals, the fibre content of the coupling layer can usefully lie around 5–20 vol. %, in particular 5–15 vol. % lower than in CRP type elements.

Fibres of the carbon fibre type exhibit an elastic modulus which is approximately 5–6 times higher than that of glass fibres. With respect to elastic modulus aramide fibres lie between glass fibre and carbon fibres. Furthermore, the coefficient of thermal expansion in the coupling layer can likewise be influenced by the type of fibre. Carbon fibres e.g. exhibit a smaller coefficient of thermal expansion than that of glass fibres.

In CRP structural elements with metal joiners of aluminium or magnesium or an alloy containing at least one of these metals, the coupling layer contains for example glass fibres, in particular E-glass fibres, in particular the at the interface with the metal joiners.

Fibres that are particularly suitable in the coupling layer are so called HT (High Tenacity) carbon fibres. These are characterised by relatively high tensile strength. HT carbon fibres are employed particularly if the plastic structure contains so called HM (High Modulus) carbon fibres which in contrast to HT carbon fibres are characterised by a higher E-modulus and lower tensile strength, and the metal joiner is of aluminium or magnesium or of an alloy containing at least one of these metals.

In the various examples described in the following the plastic material comprises a fibre-reinforced plastic and the insert preferably of one of the above mentioned metals. The coupling layer is comprised of a fibre-reinforced plastic.

In a first example the coupling layer is a non-laminated, essentially homogeneous fibre composite with random orientation of fibres. The physical characteristics such as E-modulus and thermal expansion coefficient, also called thermal expansion value, lie in a range of values between E-moduli and thermal expansion values of the materials of metal and/or plastic bordering on the coupling layer. The coupling layer preferably exhibits average values of these characteristics. As a result the changes in the E-modulus and thermal expansion value are distributed over at least two contact faces and so reduced at the individual joining area. The E-modulus and thermal expansion value are determined among other factors by the choice of volume fraction of fibres and the kind of fibre.

In another example the coupling layer is a fibre composite with gradual distribution of fibres in which the fibres, however, are randomly and locally essentially uniformly oriented in the matrix. Such coupling layers—as in the above first example—are deposited on the joining surface of the insert e.g. by using a thermoplast injection moulding process, fibre spray process, a pressure type process such as "Bulk-Transfer-Moulding-Compound" process (BMC-Process), "Dough-Transfer-Moulding-Compound" process (DMC-Process) or "Sheet-Transfer-Moulding-Compound" process (SMC-Process). A particularly suitable injection moulding process is the so called "Reinforced Reaction Injection Moulding" (RRIM) process (see: Kunstoffkompendium, Vogel Fachbuch; 1990, p211ff, 229ff). In this example the gradual increase or decrease in E-modulus and thermal expansion value within the coupling layer is advantageously achieved by changing the volume fraction of fibres and the kind of fibre in the coupling layer.

In a further example the coupling layer is itself laminated i.e. it is made up of layers of fibre and is a layered fibre composite, the manufacture of which in particular makes use of manufacturing processes such as "Resin-transfer-Moulding" (RTM) or SMC with e.g. resin soaked mats or weaves i.e. so called prepregs. The layer structure may also be effected using partial or completely manual lamination (see: Introduction to the Technology of Fibre Composites, Michaeli/Wegener, Publisher Karl Hanser, p 41ff).

The gradual change in elasticity, stiffness or the thermal expansion value is achieved not only by the volume fraction of fibres, kind of fibre or length of fibre in the layer, but mainly by the orientation of the individual fibres in the fibre layer with respect to the main direction of loading (tensile, compressive loading) of the metal joiner. In addition e.g. fibre layers are employed of the kind in which their mechanical values, i.e. the orientation of the fibres, are emphasised, preferably in one direction (rovings lying parallel) or in two directions (weaves, layings) or in a plurality of directions (multi-axial layings). The exact orientation of the fibres in the main direction of the forces present corresponds to a fibre orientation of 0°. The exact orientation of the fibres perpendicular to the main direction of the forces present corresponds to a fibre orientation of +/−90°.

At metal joiners of relatively high elasticity (in comparison with the plastic element), for example aluminum, magnesium or their alloys, there are preferably fibre layers with lower shear force transmission. This means that the orientation of the fibres usefully lies in the range of −70° to −30° or +30° to +70°, preferably from −60° to −30° or +30° to +60° and especially preferably from −50° to −40° or +40° to +50°.

The fibres run in particular in the case of an oriented fibre layer structure always parallel to the longitudinal face of the insert. In the following examples it is assumed that the oriented fibres mainly lie parallel to the longitudinal face of the insert.

At metal joiners of relatively low elasticity, for example some kinds of steel, the fibre layers with not so low shear force transmission have a fibre orientation usefully in the range of, for example, −20° to +20°, preferably from −10° to +10°.

The orientation of the fibres or the fibre layers in the coupling layer at the contact face to the plastic material is usefully in accordance with the orientation of the fibres or fibre layers lying at the contact face in the plastic material. The deviation between both fibre orientations at the interface plastic material/coupling layer is usefully smaller than +/−60°, preferably smaller than +/−45°.

The intermediate fibre layers in the coupling layer exhibit e.g. fibre orientations which lie between the prevailing values of fibre orientation in the outermost fibre layers.

Layer systems can be constructed which are characterised by an ever repeating sequence of fibre layers with different directions of fibres.

In general the change in volume fraction of fibres in the coupling layer exhibits a less significance influence on the thermal expansion behaviour and the elasticity than the specific direction of the fibres, for which reason the last mentioned method is preferred.

A fibre system for a coupling layer is e.g. as follows: $[(0°/+45°/-45°)_x]_{sym}$, where 0° represents the direction of the main forces acting on the insert, which as a rule lie parallel to the longitudinal face of the insert, and the details concerning angles shown in brackets correspond to a three part fibre layer sequence with corresponding orientations of fibres. "x" represents a natural number (excluding 0) and stands for the number of immediately following three part fibre layer sequences in the coupling layer, where x=1 corresponds exactly to one such layer sequence. Such sequences of fibre layers are symmetrical, as is normal in lamination technology. The expression "sym" stands for a mirror-image, symmetrical structure of the fibre layer sequence shown between brackets, which possibly repeats itself, where-by the plane of symmetry in the case of thin coupling layers preferably lies in the central longitudinal plane of the insert, and in thicker coupling layers is preferably formed by a plane lying in the coupling layer in question, parallel to the longitudinal face or central longitudinal plane of the insert. Thereby, care must be taken to ensure that in the case of the relatively more elastic metal joiners of aluminum or magnesium the fibre layers of lower shear force transmission lie at the metal joiner.

Here the orientation of the fibres in the fibre layer usefully lie in a range of $[(-10°$ to $+10°/+30°$ to $+60°/-30°$ to $-60°)_x]_{sym}$. Preferred is a sequence of 2 to 4 fibre layers, in particular 3 fibre layers. Possible, however, are also layer sequences of significantly more or less than three fibre layers. The number x of the fibre layer sequence is preferably 1; it may, however, be almost any size, usefully however smaller than 7 and ideally smaller than 3.

Possible are also immediate sequences of a plurality of fibre layer systems of the above described kind, whereby the individual layer systems can preferably differentiate from each other in terms of different fibre material and/or plastic material but also in terms of different orientation of fibre layers in the sequence of fibre layers:

$$[(0°/+45°/45°)_x]_{sym}//[(0°/+60°/-60°)_x]_{sym}.$$

The fibre systems are delimited from each other by "//". In this case the planes of symmetry of the individual fibre layer systems lie in the coupling layer and preferably run parallel to the longitudinal faces of the inserts. In the above example one fibre layer system contains glass fibres and the other HT-carbon fibres, whereby in the case of relatively elastic metal joiners of aluminum or magnesium the glass fibres preferably lie at the metal joiner.

The thickness of the coupling layer is usefully 0,4–4 mm, preferably 0,5–3 mm, advantageously 0,8–2,5 mm. In particular at the points and the ends of the longitudinal faces of the inserts, the coupling layer may, in the direction parallel to the longitudinal direction, be a multiple of the above mentioned layer thickness. At these places the particularly large changes in stiffness have to be reduced and to allow the polar moment of inertia to run into the coupling layer in order to increase the fatigue strength.

Also it should be noted that the adhesive layer or the matrix layer of the coupling layer between the metal joiner and the first fibres or fibre layer must not be too thick as on curing the coupling layer, the adhesive shrinks and the joining interface tends to weaken. The above mentioned adhesive layer is usefully thinner than 0,6 mm, preferably 0,1–0,5, ideally around 0,3 mm thick.

The coupling layer may also contain filler materials of the above described kind. Thus the thermal expansion characteristic can be influenced by addition of additives with smaller thermal expansion values such as powdered quartz or metal powders. The mechanical strength can be influenced e.g. by adding sand, metal turnings, textile flakes etc.

In a first version the plastic material of the plastic structural element may be a fibre composite with endless or long fibres, preferably CF (carbon fibres), in particular High-Modulus-CF in which the fibres are randomly and uniformly oriented in the matrix. The plastic structural elements are manufactured e.g. in a thermoplast injection moulding process, in a Bulk-transfer-Moulding-Compound (BMC) process or a Dough-Transfer-Moulding-Compound (DMC) process, preferably in a BMC process.

A preferred second version concerns plastic materials comprising a fibre composite containing e.g. endless or long fibres, preferably CF, in particular High-Modulus CF in the form of textile type make-ups. The plastic structural elements are manufactured e.g. in a RTM process or SMC process preferably with resin-soaked mats, weaves i.e. with so called prepregs. The structure may also be formed using partial or completely manual lamination, whereby the manual lamination is a very labour intensive, expensive and less preferred process.

The casting or pressing tools are designed in such a manner that they can accommodate the inserts and these are joined permanently in a defined region to the plastic material during the casting or pressing process.

The length of insert which is not to be integrated in the plastic material is e.g. previously introduced and held there by virtue of its shape at the desired place in a cavity in the tool or mould in such a manner that, during the casting or pressing process, the plastic mass cannot penetrate the cavity, thus leaving this length of insert free.

The tensile strength at the joining interface of the plastic material and the insert in the plastic component can as a result of the described coupling layer equal that e.g. of aluminium.

In the case of glass-fibre-reinforced plastic structural elements it may be possible, depending on the lamination of the plastic material, to omit a coupling layer. This assumes, however, that the E-modulus and the thermal expansion value at the transition from one material to the other do not exhibit a pronounced, sudden change. In such cases the difference in the stiffness of both materials is—as described below—reduced in particular by the shape of the metal joiner.

The reduction in the change of stiffness in the metal-plastic composite can be improved also by the reduction of the polar moment of inertia of the insert, in particular the polar moment of inertia of the embedded length of insert. This concerns in particular inserts made of steel or thick-walled inserts e.g. of aluminum or magnesium which exhibit higher stiffness than the plastic component.

The design of the shape of the insert should enable the polar moment of inertia to be kept small. The length of insert in the composite is e.g. made finger-shaped. One advantageous shape is a comb-like shaping of the fingers, whereby this is e.g. in the form of strips running parallel to each other and uniformly broad or tapering towards their free ends. The length of finger is e.g. 5–50 mm, preferably 7–20 mm. advantageously 10–15 mm, and the thickness of a finger is e.g. 1–10 mm, preferably 3–5 mm. The fingers or strips may be made in the form of fringes by cutting into the insert in such a manner that no spaces or distances result between the individual strips, or distances or, recesses may be formed between the fingers or strips which have the width of a finger or a strip. A further preferred version employs finger-shaped fanning out of the strips and tapering towards the free ends of the same. By the finger-shaped fanning out of the insert an additional anchoring effect is achieved.

The embedded length of insert may also feature holes, whereby the fraction of holes can be varied according to the desired stiffness. The stiffness may e.g. be pronouncedly reduced by means of a mesh-like shape of embedded length of insert. The resultant increase in surface also effects a better bonding between the embedded length of insert and the plastic material. Further, the stiffness of the insert can also be reduced by reducing the wall thickness. The above mentioned shapes which are characterised by the reduction in stiffness of the insert are also suitable for equalizing or opening thermo-mechanical stresses due to different coefficients of thermal expansion.

The exact shaping to reduce the polar moment of inertia is, however, essentially dependent on the kind of load applied to the insert e.g. whether this is mainly tensile, torsional or shear type forces.

Furthermore, the inserts may exhibit openings, e.g. in the form of holes, and looping of reinforcing fibres, fibre strands and/or preferably textile-like structures through the openings. The re-inforcing fibres, fibre strands and/or preferably textile-like structures looping through the openings are embedded in the plastic matrix of the plastic component and intimately bonded to it. The loops may e.g. be simple loops such as eye-like or parallel loops.

The textile-like structures may be rectangular in shape and pass through one or more slit-shaped or round hole openings in the embedded length of insert, whereby the openings preferably exhibit rounded edges and corners. The textile-like structures may have any shape of choice, especially at their free ends. The textile-like structures may e.g. exhibit comb-like arranged strips or fringes i.e. individual fibres or strands of fibres at the end. The textile-like structures may in particular be strip-shaped and pass through round openings in the embedded length of insert. The number of openings with loop-type connections in one insert may be chosen at will.

The insert may contain one or more looping textile-like structures arranged beside each other or after each other, in particular strip-shaped textile-like structures. In particular strip-shaped textile-like structures may be arranged fan-like around the insert so that tensile forces running parallel to the face of the insert in different directions are transmitted better into the plastic component. The insert or the embedded length of insert may also exhibit projections with hole-like openings for looping of fibres, fibre strands or textile-like structures.

The plastic components containing the above mentioned inserts with looping textile-like structures preferably contain reinforcing fibres in the form of textile-like structures.

The textile-like structures are e.g. fleeces, non-wovens, non-net-like systems, such as weaves, uni-directional or bi-directional webs, latticework or mats etc. or e.g. mesh-like systems such as knitted structures or webs and lace-like structures. Preferred are mainly textile-like structures made from directional fibres and in particular textile weaves from preferably long fibres with fibre lengths of e.g. 3–150 mm or endless fibres. The fibres are comprised usefully of glass or carbon and preferably of flexible and elastic aramide (e.g. Kevlar® or Twaron®).

Plastic structural elements with above mentioned inserts with looping textile-like structures are preferably manufactured using a Resin-Transfer-Moulding (RTM) process. The inserts are laid in a mould cavity with their embedded length and the textile-like structures looping through them along with the fibre blank of the plastic component. The fibre structures are soaked with a plastic matrix and then hardened to yield a plastic component. The looping textile-like structures are thereby bonded into the plastic matrix and adhesively bonded to it, as a result of which an extremely intimate and tough material composite is formed. Further manufacturing processes are e.g. the previously mentioned SMC or BMC processes.

Inserts with looping reinforcing fibres, fibre strands and/or textile-like structures may if desired contain a coupling layer of the kind and structure described above.

Sharp edges and pointed corners at the embedded length of insert are to advantage avoided. The corners and edges in the insert are therefore usefully bevelled, chamfered and/or rounded. In order to reach optimal strength and transmission of force into the plastic structure, thick-walled inserts in particular are bevelled e.g. inserts with wall thickness of 5 mm and more, in a ratio of x:y which preferably lies between 1:40 and 1:5, advantageously between 1:30 and 1:10, ideally around 1:20. The ratio x:y represents the tangent of the acute angle $\alpha$ formed by a line running parallel to the central axis z and the straight line joining both ends of the bevelling.

The plastic structural elements according to the invention may be attached to a neighbouring metal structure, composite parts or another plastic structural element via the inserts or metal joiners using practically any mechanical means of joining. The connections may take place using clinching processes according to TOX®, Billhof or Eckold, by means of riveting methods such as stamp riveting, shear-type riveting, or conventional riveting methods, by means of bolting, or welding such as metal inert gas (MIG) welding, tungsten inert gas (MIG) welding, spot welding, friction welding. By way of preference a welding method is employed in which the amount of heat introduced to the plastic element can be kept as small as possible e.g. laser welding. If the neighbouring structure is a composite, then e.g. also impulse welding is suitable, in particular the ultrapulse welding method.

The plastic structural element with insert may be manufactured in that the insert is of metal and this, in the region to come into contact with the coupling layer, is subjected to a surface treatment which improves bonding, and is provided with a coupling layer of fibre-reinforced plastic, and the insert with the length to project out of the plastic structural element introduced by virtue of shape in a cavity in the mould or pressing tool, and the plastic structural element is shaped in a casting or pressing process and the embedded length of insert bearing the coupling layer is laminated into the plastic material and forms with that a join by virtue of shape.

The present invention offers the advantage that, using a cost favourable process, plastic structural elements can be produced from a reinforced plastic material with inserts as connecting points, that are characterised by very high strength and load-bearing capacity at the connecting points. As a result it is possible to integrate in the plastic structural element large area, strip-shaped or sheet-shaped inserts exhibiting high strength. This permits the designer to mount elements of other assemblies at any place onto inserts on the plastic structural element, whereby the kind of attachment means can likewise be chosen at will. Furthermore, as a result of the present invention plastic structural elements can be applied for functions in which up to now the component was not able to withstand the high loads and stresses at its connecting points. Thanks to the coupling layer the possible additional danger of aluminum inserts in particular starting to corrode as a result of electrolytic contact with the carbon fibres is eliminated.

Described in the following three examples of preferred exemplified embodiments are plastic structural elements according to the invention viz., plastic structural elements of fibre-reinforced plastic material with inserts of metal (metal joiners) laminated in via a coupling layer. In that description:

$\beta$: coefficient of thermal expansion in the unit 1/K (K: Kelvin):

E: E-modulus (elastic modulus) in the main tensile direction in the unit GPa (GPa: Giga-Pascal)

EXAMPLE NO. 1

Metal joiner:
Material: aluminum sheet AA6060 (AlMgSi0.5 acc. to DIN)
$\beta=23.4\times10^{-6}$
E=73
Coupling layer:
Material: GRP-laminate with epoxy resin matrix and glass fibres Fibre content: approx. 50 vol. %
Structure of the fibre layers and their orientation in the coupling layer: $[(0°/+45°/-45°)_x]_{sym}$, where x=1 and the −45° layer comes against the metal joiner.
$\beta=12.0\times10^{-6}$
=30
Plastic material of the plastic structural element:
Material: unidirectional CRP laminate with epoxy resin matrix and HT (High-Tenacity) carbon fibres Fibre content: approx. 60 vol. %
$\beta\to0$
E=180

EXAMPLE NO. 2

Metal joiner:
Material: aluminum sheet AA6060 (AlMgSi0.5 acc. to DIN)
$\alpha=23.4\times10^{-6}$
E=73
Coupling layer:
Material: CRP-laminate with epoxy resin matrix and HT (High-Tenacity) carbon fibres Fibre content: approx. 50 vol. %
Structure of the fibre layers and their orientation in the coupling layer: $[(0°/+45°/-45°)_x]_{sym}$, where x=1 and the −45° layer comes against the metal joiner.
$\alpha=12.0\times10^{-6}$
E=125
Plastic material of the plastic structural element:
Material: unidirectional CRP laminate with epoxy resin matrix and HM (High-Modulus) carbon fibres Fibre content: approx. 60 vol. %
$\alpha\to0$
E=180

EXAMPLE 3

Metal joiner
Material: steel sheet ST 14
$\alpha=13.0\times10^{-6}$
E=206
Coupling layer:
Material: CRP-laminate with epoxy resin matrix and HT (High-Tenacity) carbon fibres Fibre content: approx. 50 vol. %
Structure of the fibre layers and their orientation in the coupling layer: $[(0°/+45°/-45°)_x]_{sym}$, where x=1 and the 0° layer comes against the metal joiner.

$\alpha = 12.0 \times 10^{-6}$
E=125
Plastic material of the plastic structural element:
Material: unidirectional CRP laminate with epoxy resin matrix and HM (High-Modulus) carbon fibres Fibre content: approx. 60 vol. %
$\alpha \to 0$
E=180

In all of the examples the fibre-reinforced plastic material exhibits a thermal expansion value a approaching zero ($\alpha \to 0$). The average thermal expansion values of the coupling layers are in each case smaller than that of the metal joiner and larger than that of the corresponding plastic. In examples 1 and 2 these values lie approximately in between. The steel sheet used in example 3 on the other hand exhibits a relatively low coefficient of thermal expansion, for which reason in that case the coupling layer, with only slightly smaller coefficient of thermal expansion than that of the steel sheet, produces a smaller equilibrium effect.

The E-modulus of the coupling layers in the above examples are mixed values. The equilibrating of the E-modulus is in comparison with the coefficient of thermal expansion of secondary importance, for which reason in examples 1 and 3 the equilibration of the E-modulus is given less importance. Example No. 2 shows a coupling layer which both with respect to the coefficients of thermal expansion and the E-modulus produces a gradual change between the metal joiner and the plastic material.

BRIEF DESCRIPTION OF THE DRAWINGS

The invention is explained in greater detail the following with the aid of the drawings which show:

FIG. 6b is a cross-section through an insert as shown in FIG. 6a;

FIG. 10b is a cross-section through an insert as shown in FIG. 10a;

DETAILED DESCRIPTION OF THE PREFERRED EMBODIMENTS

Figure 1:
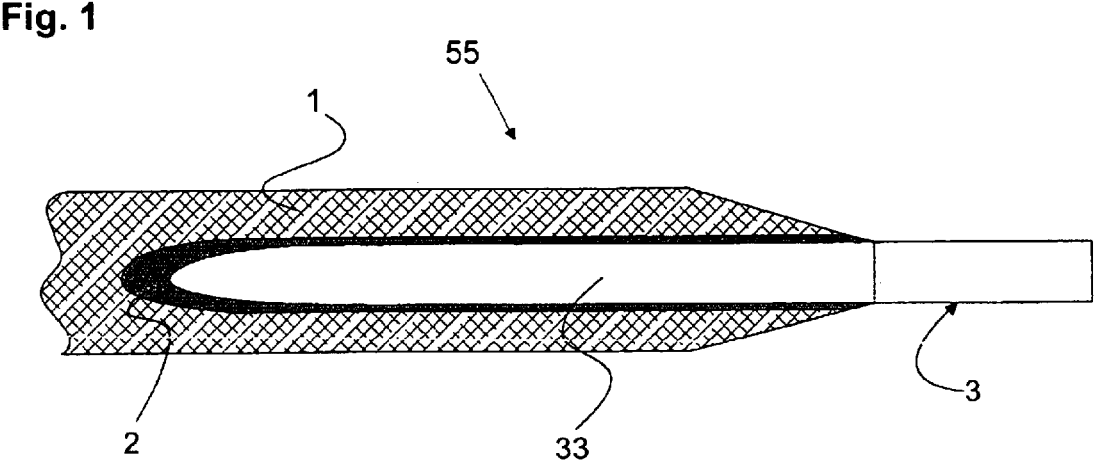
FIG. 1 is a cross-section through a plastic structural element with an insert.

FIG. 1 shows a plastic structural element 55 with an insert 3 shown in cross-section. The insert 3 comprises an aluminium sheet. The wall-thickness is around 4 mm and the embedded length 33 of the insert 3 is embedded to a depth of around 10 mm in the plastic material 1. The plastic material 1 is a CRP layer type laminate with epoxy resin matrix. The carbon fibres are embedded in the matrix as rovings with fibres (endless fibres) lying parallel. The fibre content amounts to around 60 vol. %. The plastic material 1 and the insert 3 are joined together via the coupling layer 2 of GRP. The longitudinal thermal expansion of the insert in FIG. 1 is greater than the transverse thermal expansion, for which reason the coupling layer 2 is thicker in the longitudinal direction at the front end of the insert 3.

Figure 3:
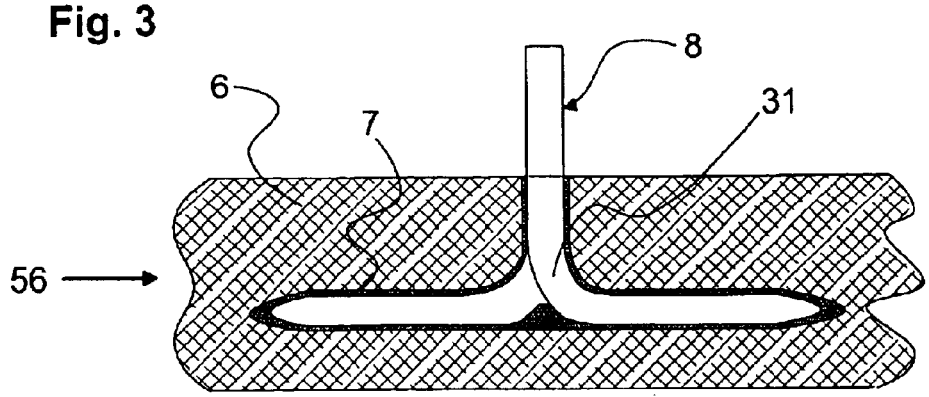
FIG. 3 is a cross-section through a plastic structural element with T-shaped insert.

FIG. 3 shows a CRP structural element 56 with a T-shaped insert 8 shown in cross-section. The embedded length 31 of the insert 8 is joined to the plastic material 6 via the coupling layer 7 of CRP. The insert 8 is originally flat-shaped and is given two or more flanges by cuts made at the side. These are bent outwards by 90° alternatingly to the right and to the left. As a result an anchoring element which is T-shaped in cross-section is obtained. The angle of bending may also be greater or smaller than 90° as desired. The T-shape of the insert 8 leads to excellent anchoring in the plastic material 6, enabling the insert 8 to be subjected to higher loads. The anchoring effect may also be achieved using other cross-sectional shapes such as e.g. hook shapes, trapezium shapes or toothed surfaces. Furthermore, the insert 8 may also contain anchoring elements of the above mentioned kind and others such as e.g. cone shapes as projections.

The insert 8 may be a longitudinal section produced preferably by extrusion.

Figure 4:
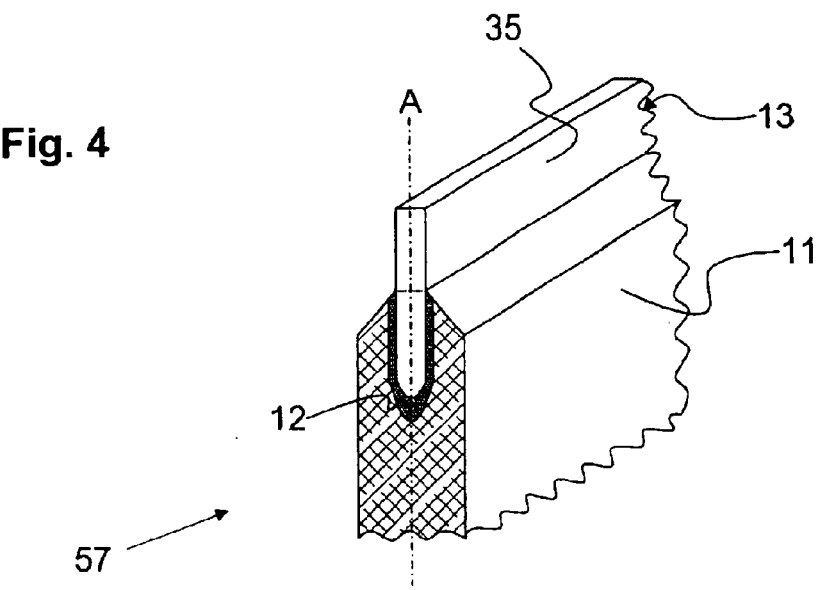
FIG. 4 is a perspective view of a plastic structural element with a strip-shaped insert.

FIG. 4 shows a perspective view of a CRP structural element 57 with a strip-shaped insert 13 of aluminium which is joined to the plastic material 11 via a coupling layer 12. Oriented fibre layers in the coupling layer 12 run essentially parallel to the longitudinal face 35 of the insert 13. The plastic structural element 57 may e.g. be tub-shaped and designed as the base assembly for vehicles. The inserts 13 laminated in at its side, vertical flanks are e.g. welded to beams or extruded sections. The axis A indicates the main direction of tensile and compressive forces acting on the insert 13 and essentially on all other inserts described.

The outer faces of the end parts of the insert 13 in the plastic material 11 are bevelled or tapered, thus removing the edges.

Figure 5:
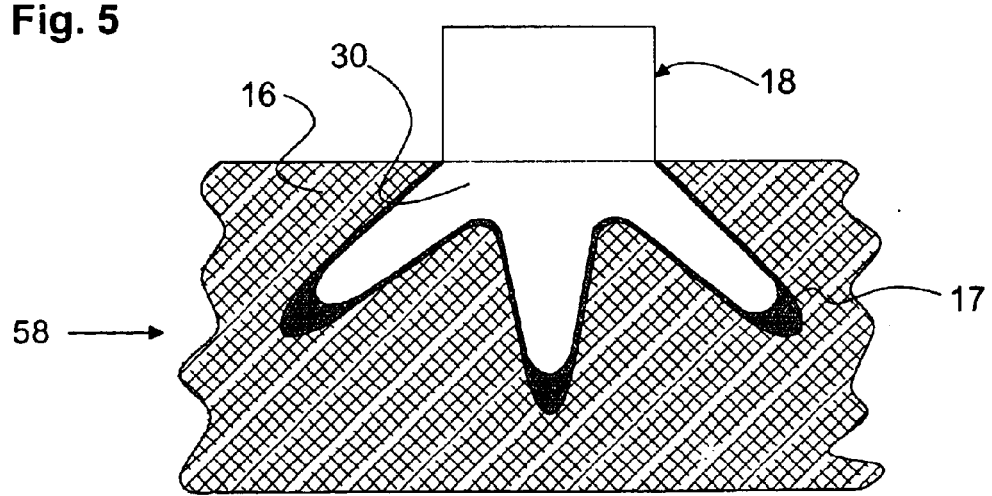
FIG. 5 is a longitudinal section through a plastic structural element with a finger-shaped insert.

FIG. 5 shows a longitudinal section through a plastic structural element 58 with a finger-shaped insert 18 of aluminium. The embedded length 30 of the insert 18 is joined to the plastic material 16 via the coupling layer 17 of fibre-reinforced plastic. The shape of the insert 18 effects a reduction in the stiffness of the insert 18, as a result of which the jump in stiffness at the joint interfaces is also reduced. The individual fingers of the insert 18 may run parallel to each other or be fanned out. The fanning out as indicated in FIG. 5 produces an anchoring effect in the plastic material 16, similar to that of the T-shaped cross-section.

Figure 2:
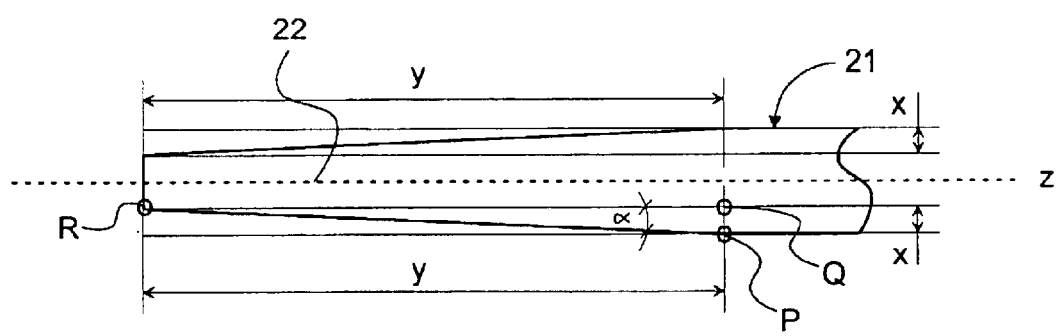
FIG. 2 is a cross-section through an end section of a tapered insert.

FIG. 2 shows a cross-section through the end section 22 of an insert 21. The end section is defined by the start of the tapering at point P. The tapering or inclination of the edges is chosen such that the tangent of the acute angle $\alpha$ enclosed by the straight lines R-P and R-Q corresponds to a ratio x:y=1:20. The tapering between the points P and R need not be a straight line. The cross-section at the line P-R may e.g. also be a parabola, have a corrugated form or some other useful shape. The same conditions are valid also for the opposite side of the insert 21 shown in FIG. 2. The edges and corners may also be rounded locally.

Figure 6A:
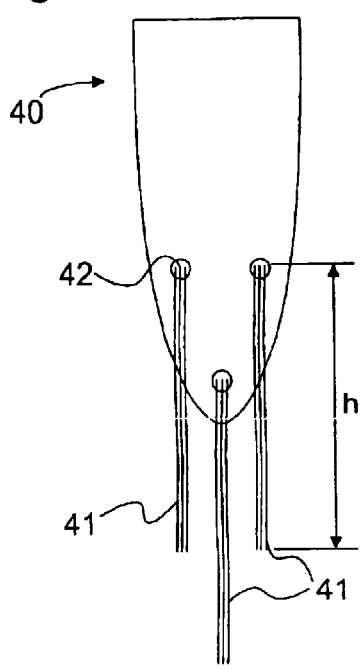
FIG. 6a is a side view of a further insert.
Figure 6B:
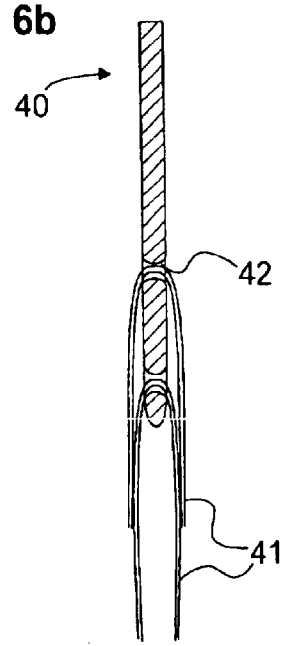

FIGS. 6a and 6b show a further version of an insert 40. This is characterised by way of the embedded length of the insert exhibiting one or more holes 42 or openings through which reinforcing fibres or fibre strands 41 can be passed, so that on laminating the insert 40 into the plastic material, looping the insert 40 into the plastic material is achieved. Usefully in this respect dry fibre rovings or fibre strands 41 or yarns, preferably 12K-type rovings, are employed. The individual threads of around 6–12 µm diameter are in that respect useful for yarns of around 1–3 mm diameter. The fibres are ideally of glass or carbon, preferably however of aramide or Kevlar®3, which are particularly flexible and elastic. On laminating in the insert 40, the fibres are adhesively bonded deep in the matrix of the plastic material, especially by their ends leading away from the insert 40, resulting in an extremely intimate and tough composite.

The half fibre length h corresponds approximately to the depth of penetration of the embedded length of the insert 40. It can e.g. amount to around 5–70 mm, usefully 10–50 mm. The fibre strands 41 transfer forces and provide further anchoring of the insert 40 in the plastic material. The rovings 41 may also be fan-shaped, which enables the insert 40 better to transfer the general tensile and compressive forces, via the force vectors in the longitudinal face of the insert 40, into the plastic structural element. It is also possible for a plurality of rovings to be drawn through each hole 42. The rovings may, by adhesive bonding or similar attachment means, be additionally fixed to the insert 40 before laminating.

Further, the holes 42 effect a reduction in the polar moment of inertia of the insert 40. The insert 40 described may, in addition, exhibit a coupling layer according to the invention.

The walls 45 of the holes 42 in the insert 40 are usefully free of burrs (see FIG. 6c) in order that the fibres are offered the largest possible contact face for transfer of forces and are resistant to wear. This applies in particular to inserts 40 having a wall thickness larger than 2–3 mm. The radius of curvature r of the deburred hole walls 45 corresponds to approximately half of the wall thickness s.

Figure 6C:
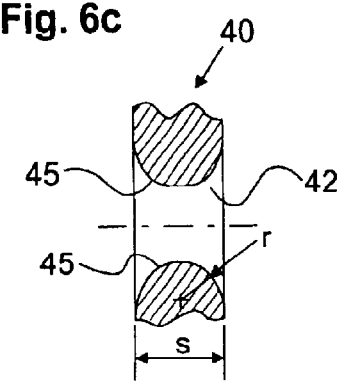
FIG. 6c is an enlarged cross-section through the hole in an insert as shown in FIG. 6b.
Figure 7:
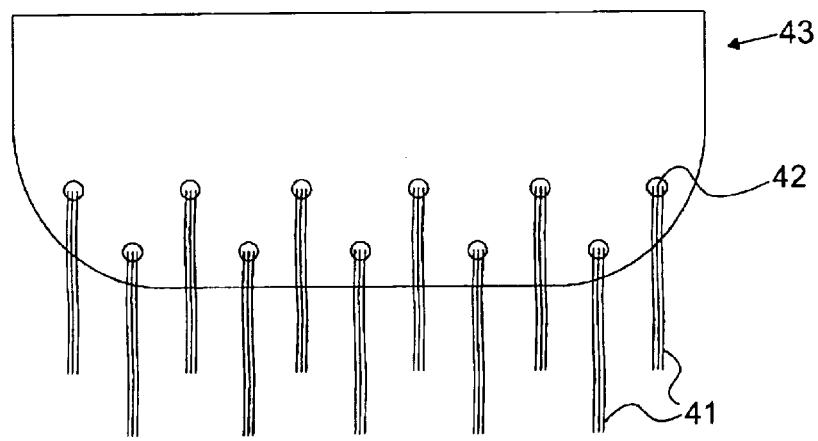
FIG. 7 is a side view of a further strip-shaped insert.
Figure 8:
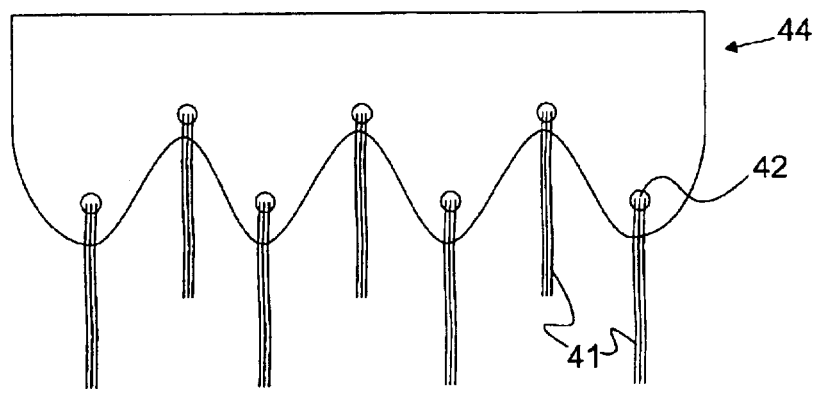
FIG. 8 is a side view of a further finger-shaped insert.

Further variants of the inserts with loop type connections described by FIGS. 6a–c are possible, whereby inserts of any shape and dimensions may be employed, preferably however in particular these shapes described in this patent application. Preferred in particular are strip-shaped inserts 43 (FIG. 7) and fan-shaped or parallel fingered inserts 44 (FIG. 8). The number of holes 42 or loop connections or fibre rovings 41 per unit area may be chosen at will; this can however be dependent, among other parameters, on the load on the insert 40, 43, 44, the dimensions of the plastic structural element and economic aspects.

Figure 9:
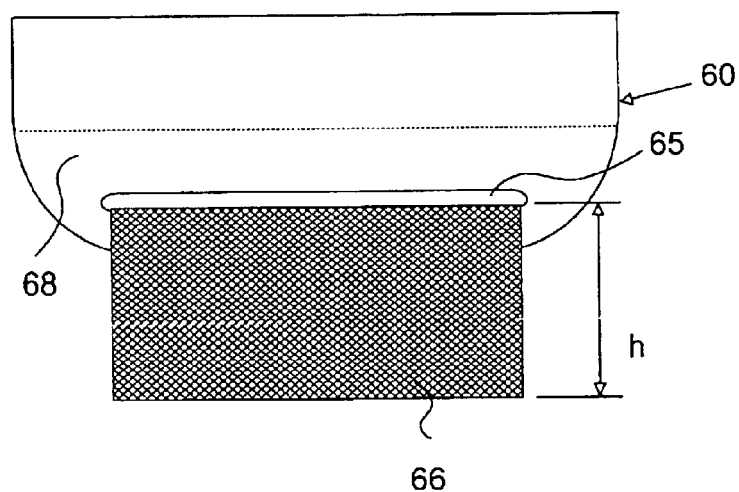
FIG. 9 is a side view of a strip-shaped insert with longitudinal slit and a textile-like structure looped through it.

In a further version of the invention a rectangular, textile type structure 66 loops through a slit-shaped opening 65 in the embedded length 68 of insert of a strip-shaped insert 60 (FIG. 9). The half length of the textile type structure corresponds approximately to the depth of penetration of the embedded length 68 of the insert 60. The length h may be e.g. around 5–70 mm, usefully around 10 to 50 mm. The looped textile type material 66 transfers forces and provides additional anchoring of the insert 60 in the plastic material.

Figure 10B:
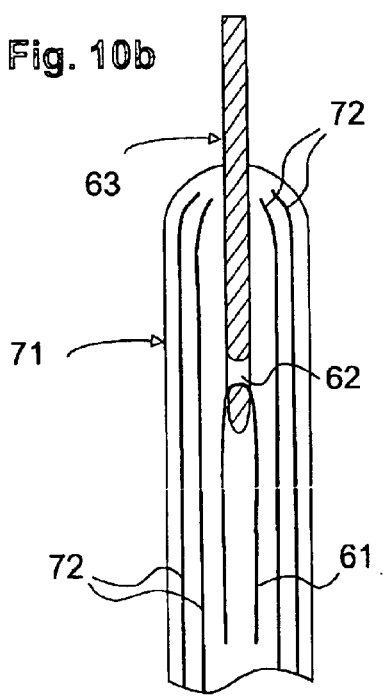
Figure 10A:
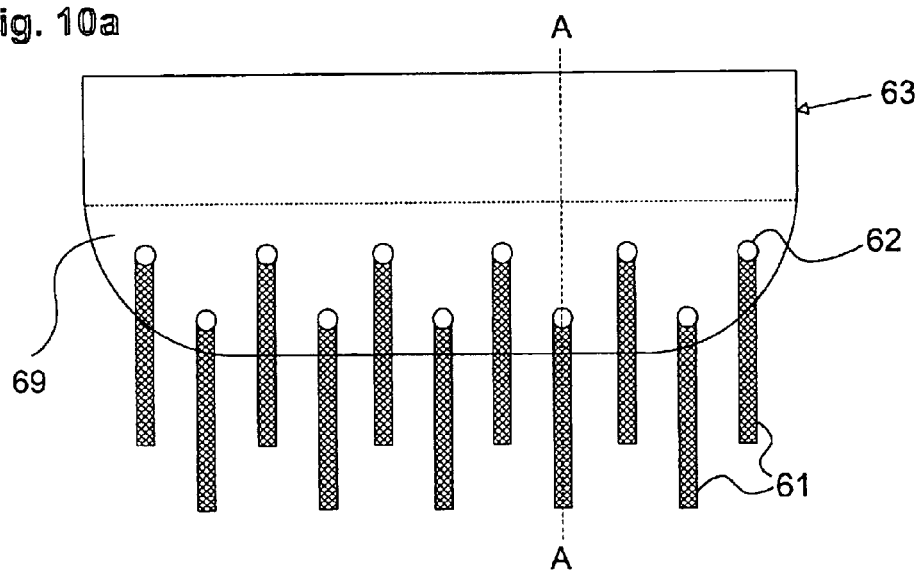
FIG. 10a is a side view of a strip-shaped insert with round hole openings and a textile-like structure looped through it.

The insert 63 shown in FIG. 10a features an embedded length 69 having a plurality of holes 62 or openings which are arranged in two lines offset with respect to each other, through which holes 62 strip-shaped, textile type material 61 passes or is looped and as a result of laminating the embedded length 69 of the insert 63 in the plastic material act as retaining loops. Further, the holes or openings 62 effect a reduction in the polar moment of inertia of the insert 63.

FIG. 10b shows a cross-section through the insert 63 along line A—A in FIG. 10a, whereby in FIG. 10b the insert 63 or its embedded length is embedded in a plastic structural element 71 and is enclosed by this. The plastic structural element 71 contains fibre layers 72 in the form of textile type material embedded in a plastic matrix. The strip-shaped textile type pieces of material 61 looping through the openings 62 lie a distance from and parallel to the fibre layers 72. The openings 62 are rounded in such a manner that the strip-shaped textile type pieces of material 61 lie uniformly on the wall of the opening.

Figure 11:
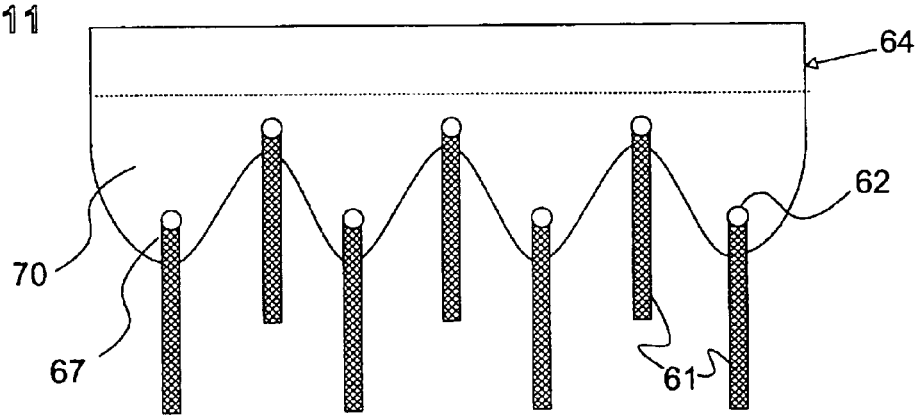
FIG. 11 is a side view of a finger-shaped insert with round hole openings and a textile-like structure looped through these.

FIG. 11 shows a strip-shaped insert 64 containing an embedded length 70 of insert 70 with finger shaped projections 67, whereby round hole openings 62 with looped, strip-shaped textile type material 61 are provided at the front end regions of the projections 67 and close to the edge between two projections 67.

The walls of the openings in insert 60, 63, 64 are usefully free of burrs (see also FIG. 6c) in order that the fibres are offered the largest possible force transmitting contact surface and no local peak stresses arise at the edges. This holds in particular for inserts with a wall thickness of greater than 2–3 mm. The radius of curvature r of the deburred hole wall corresponds e.g. approximately to around half of the wall thickness s.

Further, the embedded length of the inserts shown in FIGS. 7–11 may also exhibit a coupling layer.

The invention is not limited by the embodiments described above which are presented as examples only but can be modified in various ways within the scope of protection defined by the appended patent claims.

What is claimed is:

1. A plastic structural element, comprising: a fiber reinforced plastic material with a matrix-forming plastic; an insert having a length embedded in the matrix-forming plastic and a length that projects from the fiber reinforced plastic material whereby the length of the insert that projects from the fiber reinforced plastic material forms a connection for connecting attachment means, the insert exhibiting different values of at least one of elastic modulus and thermal expansion coefficients compared to the fiber reinforced plastic material; and a plastic coupling layer arranged on a surface of the insert to join the insert to the fiber reinforced plastic material, the coupling layer being an intermediate layer of fiber-reinforced plastic, the fibers of which are not embedded in the matrix-forming plastic of the plastic structural element, the coupling layer being of a material different from the fiber reinforced plastic material of the plastic structural element, and having a volume fraction of fibers, type of fibers, length of fibers and alignment of fibers or fiber layers so that at least one of the elastic modulus and the coefficient of thermal expansion changes through the coupling layer whereby the elastic modulus and the coefficient of thermal expansion between the fiber reinforced plastic material and the insert are equilibrated so that differences in at least one of the elastic modulus and the coefficient of thermal expansion at an interface between the fiber reinforced plastic material and the insert are minimized.

2. A plastic structural element according to claim 1, wherein the coupling layer contains a reinforced plastic in an epoxy resin matrix.

3. A plastic structure element according to claim 2, wherein the coupling layer contains fiber-reinforced plastic with a fiber content of 30–70 vol. %.

4. A plastic structure element according to claim 3, wherein the fiber-reinforced plastic is a glass reinforced plastic (GRP).

5. A plastic structure element according to claim 4, wherein the glass reinforced plastic contains E-glass fibers.

6. A plastic structure element according to claim 3, wherein the fiber-reinforced plastic is a carbon reinforced plastic (CRP).

7. A plastic structural element according to claim 6, wherein the carbon reinforced plastic contains carbon fibers.

8. A plastic structure element according to claim 3, wherein the fiber-reinforced plastic is a mixture of carbon reinforced plastic and glass reinforced plastic.

9. A plastic structure element according to claim 3, wherein the fiber-reinforced plastic has a fiber content of 45–60 vol. %.

10. A plastic structure element according to claim 1, wherein the plastic material contains a reinforced plastic in an epoxy resin matrix.

11. A plastic structure element according to claim 10, wherein the reinforced plastic is a fiber-reinforced plastic with a fiber content of 40–70 vol. %.

12. A plastic structure element according to claim 11; wherein the fiber-reinforced plastic is one of glass reinforced plastic, carbon reinforced plastic and a mixture of glass reinforced plastic and carbon reinforced plastic.

13. A plastic structural element according to claim 12, wherein the fiber-reinforced plastic is a carbon reinforced plastic.

14. A plastic structure element according to claim 11, wherein the plastic material has a fiber content of 55–65 vol. %.

15. A plastic structure element according to claim 1, wherein the insert contains a metal.

16. A plastic structural element according to claim 15, wherein the metal is one of aluminum, magnesium, an alloy containing aluminum, an alloy containing magnesium, steel and zinc coated iron.

17. A plastic structural element according to claim 1, wherein the insert is made of one of aluminum, magnesium, an alloy containing aluminum and an alloy containing magnesium, the plastic material being reinforced by fibers and having a fiber content of 40 to 70 vol. %, the coupling layer being reinforced by fibers, the coupling layer having a fiber content that is on average 5–15 vol. % lower than the fiber content of the plastic material.

18. A plastic structural element according to claim 17, wherein the plastic material is reinforced by carbon fibers.

19. A plastic structural element according to claim 17, wherein the coupling layer is reinforced by at least one of carbon fibers and glass fibers.

20. A plastic structural element according to claim 19, wherein the coupling layer is reinforced by one of carbon fibers and fiberglass.

21. A plastic structural element according to claim 8, wherein at least one of the volume fraction of fibers in the coupling layer decreases toward the insert starting from the plastic material, and the volume fraction of glass fibers increases toward the insert in relation to the amount of carbon fibers.

22. A plastic structural element according to claim 17, wherein at least one of the volume fraction of fibers in the coupling layer decreases toward the insert starting from the plastic material, and the volume fraction of glass fibers increases toward the insert in relation to the amount of carbon fibers.

23. A plastic structural element according to claim 1, wherein the insert is made of one of aluminum, magnesium, an alloy containing aluminum and an alloy containing magnesium, the coupling layer being a layered composite and having a layered structure of fiber layers, wherein fibers in individual layers of the structure are oriented in at least one direction, at least one of the fibers and the fiber layers arranged next to the plastic material being aligned with a direction of neighboring fibers and the fiber layers in the plastic material so that a deviation in an angle of orientation of the fibers is less than 60°, one of the fibers and fiber layers adjacent to the insert having an orientation of −30° to −70° or +30° to +70°, where 0° represents a main direction of forces actable on the insert.

24. A plastic structural element according to claim 23, wherein the deviation in the orientation of the fibers is less than 45°.

25. A plastic structural element according to claim 23, wherein the fibers are oriented in a direction parallel to a side face of the coupling layer.

26. A plastic structural element according to claim 3, wherein the fibers and the fiber reinforced plastic of the coupling layer are formed as fiber layers whereby a plurality of fiber layers form a fiber layer system, the individual fiber layers or the individual fiber layer systems made up of a sequence of fiber layers containing different types of fibers.

27. A plastic structural element according to claim 25, wherein the fibers are carbon fibers and glass fibers, at least one fiber layer of glass fibers being arranged to lie against the embedded length of the insert.

28. A plastic structural element according to claim 23, wherein the fibers and the fiber reinforced plastic of the coupling layer are formed as fiber layers whereby a plurality of fiber layers form a fiber layer system, the individual fiber layers or the individual fiber layer systems made up of a sequence of fiber layers containing different types of fibers.

29. A plastic structural element according to claim 28, wherein the fibers are carbon fibers and glass fibers, at least one fiber layer of glass fibers being arranged to lie against the embedded length of the insert.

30. A plastic structural element according to claim 1, wherein the insert has a surface, at least the surface of the insert being made of one aluminum and aluminum alloy, portions of the insert surface which receive the coupling layer being chemically treated.

31. A plastic structural element according to claim 30, wherein the portions of the insert surface which receive the coupling layer are one of phosphate treated, chromate treated and anodically oxidized.

32. A plastic structural element according to claim 30, wherein the metallic surfaces of the insert are one of degreased and roughened at the portions receiving the coupling layer.

33. A plastic structural element according to claim 1, wherein the embedded length of the insert has an enlarged surface area.

34. A plastic structural element according to claim 33, wherein the enlarged surface area is formed by one of openings and grid-like structures in the insert.

35. A plastic structural element according to claim 1, wherein the embedded length of the insert has anchor-like elements.

36. A plastic structural element according to claim 35, wherein the anchor-like elements are one of hook-shaped, T-shaped and trapezium-shaped projections.

37. A plastic structural element according to claim 1, wherein the embedded length of the insert is shaped as an anchoring element.

38. A plastic structural element according to claim 37, wherein the anchoring element is formed by one of bends in the embedded length and corrugations.

39. A plastic structural element according to claim 1, wherein the insert has force transferring reinforcing fibers which are laminated into the plastic material so as to anchor the insert in the plastic material whereby the laminated-in reinforcing fibers are joined to the insert by a loop-type connection.

40. A plastic structural element according to claim 39, wherein the reinforcing fibers are aramide fibers.

41. A plastic structural element according to claim 1, wherein the insert has end parts that are tapered with a ratio of x:y of 1:30 to 1:10, wherein the ratio x:y represents a tangent of an acute angle which is formed by a line running parallel to a central axis and a line joining both end points of the tapering.

42. A plastic structural element, comprising: a fiber reinforced plastic material with a matrix—forming plastic; an insert having a length embedded in the matrix—forming plastic and a length that projects from the fiber reinforced plastic material whereby the length of the insert that projects from the fiber reinforced plastic material forms a connection for connecting attachment means, the insert exhibiting different values of at least one of elastic modulus and thermal expansion coefficients compared to the fiber reinforced plastic material; and a plastic coupling layer arranged on a surface of the insert to join the insert to the fiber reinforced plastic material, the coupling layer being an intermediate layer of fiber reinforced plastic, the fibers of which are not embedded in the matrix—forming plastic of the plastic structural element, the coupling layer being of a material different from the fiber reinforced plastic material of the plastic structural element, and having a volume fraction of fibers, type of fibers, length of fibers and alignment of fibers or fiber layers so that at least one of the elastic modulus and the coefficient of thermal expansion changes through the coupling layer whereby the elastic modulus and coefficient of thermal expansion between the fiber reinforced plastic material and the insert are equilibrated so that differences in at least one of the elastic modulus and the coefficient of thermal expansion at an interface between the fiber reinforced plastic material and the insert are minimized; and the plastic structural element exhibiting the following feature: the insert having at least one aperture through which at least one of reinforcing fibers, fiber strands and textile type materials are looped and are embedded in and intermittently joined to the plastic matrix of the plastic structural element at its free end so as to anchor the insert in the plastic material.

43. A plastic structural element, comprising: a fiber reinforced plastic material with a matrix—forming plastic; an insert having a length embedded in the matrix—forming plastic and a length that projects from the fiber reinforced plastic material whereby the length of the insert that projects from the fiber reinforced plastic material forms a connection for connecting attachment means, the insert exhibiting different values of at least one of elastic modulus and thermal expansion coefficients compared to the fiber reinforced plastic material; and a plastic coupling layer arranged on a surface of the insert to join the insert to the fiber reinforced plastic material, the coupling layer being an intermediate layer of fiber reinforced plastic, the fibers of which are not embedded in the matrix—forming plastic of the plastic structural element, the coupling layer being of a material different from the fiber reinforced plastic material of the plastic structural element, and having a volume fraction of fibers, type of fibers, length of fibers and alignment of fibers or fiber layers so that at least one of the elastic modulus and the coefficient of thermal expansion changes through the coupling layer whereby the elastic modulus and coefficient of thermal expansion between the fiber reinforced plastic material and the insert are equilibrated so that differences in at least one of the elastic modulus and the coefficient of thermal expansion at an interface between the fiber reinforced plastic material and the insert are minimized; and the plastic structural element exhibiting the following feature: the embedded length of the insert is one of strip—shaped and finger—shaped with a plurality of strips or fingers configured so as to reduce a geometrical movement of inertia of the embedded length, the strips or fingers one of lie parallel, are comb—shaped and fan—shaped.

\* \* \* \* \*